(12) United States Patent
Kitawaki et al.

(10) Patent No.: US 7,393,400 B2
(45) Date of Patent: Jul. 1, 2008

(54) NON-AQUEOUS INK COMPOSITION FOR INK JET

(75) Inventors: Takaya Kitawaki, Izunokuni (JP); Masashi Hiroki, Yokohama (JP); Hiroshi Kiyomoto, Hiratsuka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 265 days.

(21) Appl. No.: 11/299,199

(22) Filed: Dec. 8, 2005

(65) Prior Publication Data

US 2007/0022904 A1 Feb. 1, 2007

Related U.S. Application Data

(63) Continuation-in-part of application No. 11/189,418, filed on Jul. 26, 2005, now abandoned.

(51) Int. Cl.
*C09D 11/00* (2006.01)
*C09D 11/02* (2006.01)

(52) U.S. Cl. .................. 106/31.86; 106/31.66

(58) Field of Classification Search ............ 106/31.86, 106/31.66
See application file for complete search history.

(56) References Cited

U.S. PATENT DOCUMENTS 4,822,417 A * 4/1989 Kobayashi et al. .......... 524/308
5,318,617 A * 6/1994 Nagasawa et al. ........... 524/106
5,849,814 A * 12/1998 Fujita ........................ 523/161
7,022,172 B2 * 4/2006 Ohkawa et al. ........... 106/31.86
7,060,125 B2 * 6/2006 Ohkawa et al. ........... 106/31.57
2003/0005856 A1 * 1/2003 Leu et al. ................. 106/31.67
2005/0215664 A1 * 9/2005 Elwakil et al. ............. 523/160
2006/0117996 A1 * 6/2006 Ichikawa et al. ......... 106/31.86
2007/0131137 A1 * 6/2007 Kitawaki et al. ........... 106/31.6

FOREIGN PATENT DOCUMENTS

| JP | 2001-220527 | 8/2001 |
| JP | 2002-363465 A | 12/2002 |
| JP | 2003-96370 A | 4/2003 |
| JP | 2003-261808 A | 9/2003 |
| JP | 2004-250502 A | 9/2004 |
| JP | 2004-250503 A | 9/2004 |

OTHER PUBLICATIONS

Related U.S. Appl. No. 11/216,976, filed Aug. 31, 2005; Inventors: Masashi Hiroki et al.; Title: Ink Composition for Inkjet.
Related U.S. Appl. No. 11/221,125, filed Sep. 6, 2005; Inventors: Masashi Hiroki et al.; Title: Ink Composition for Inkjet.
U.S. Appl. No. 11/413,558, filed Apr. 28, 2006, Inventors: Masashi Hiroki et al, Title: Non-Aqueous Ink Composition for Inkjet.

* cited by examiner

*Primary Examiner*—Helene Klemanski
(74) *Attorney, Agent, or Firm*—Frishauf, Holtz, Goodman & Chick, P.C.

(57) ABSTRACT

Disclosed is a non-aqueous ink composition for ink jet, comprising a pigment, a dispersant, and a non-aqueous solvent. At least 50% by weight of the entire non-aqueous solvent is an ester series solvent having 24 to 36 carbon atoms.

10 Claims, No Drawings

NON-AQUEOUS INK COMPOSITION FOR INK JET

CROSS-REFERENCE TO RELATED APPLICATIONS

This is a Continuation-in-Part application of U.S. patent application Ser. No. 11/189,418, filed Jul. 26, 2005, now abandoned, the entire contents of which are incorporated herein by reference.

BACKGROUND OF THE INVENTION

1. Field of the Invention

The present invention relates to a non-aqueous ink composition for an ink jet.

2. Description of the Related Art

In recent years, a recording apparatus employing an ink jet system is widely employed in homes, offices and for industrial purposes. An aqueous, non-aqueous or UV ink is used depending on the purpose in the recording apparatus of the ink jet system. Among these inks, an aqueous ink is cheap and safe and, thus, is widely used for various purposes. However, when used for printing at a high printing rate, the aqueous ink is defective in that the drying rate is low. In addition, when the aqueous ink is used for printing on an ordinary paper sheet (PPC paper sheet), there is generated a so-called cockling, i.e., the phenomenon that the paper sheet is cockled after the ink is dried. The UV ink is cured promptly, if irradiated with a UV light and, thus, is adapted for printing on a non-absorption medium or for high-speed printing. However, printing with a UV ink necessitates a large ultraviolet light irradiating apparatus requiring large power consumption.

On the other hand, where a non-aqueous ink is used for the printing on an ordinary paper sheet, the non-aqueous ink permeates into the inner region of the recording paper sheet in a short time, when the ink droplet discharged from the ink jet head strikes the recording paper sheet. As a result, high-speed printing can be performed without requiring a special mechanism so as to make it possible to obtain a satisfactory printed image while preventing the cockling phenomenon.

BRIEF SUMMARY OF THE INVENTION

In the office or home, the printed image is stored in many cases under the state that the printed image is put in a transparent file. In almost all cases, PP (polypropylene) film is used for forming the transparent file for storing the printed image. It should be noted in this connection that, the film is swollen so as to be cockled if the image printed with a non-aqueous ink is stored in the transparent file formed of the PP film. In some cases, the film is deformed by 1 mm or more so as to be broken.

An object of the present invention is to provide a non-aqueous ink composition for ink jet, which does not swell the transparent film used in the office or home so as not to deform significantly the transparent file and which exhibits a high discharging stability.

According to an aspect of the present invention, there is provided a non-aqueous ink composition for ink jet, comprising a pigment, a dispersant, and a non-aqueous solvent, wherein at least 50% by weight of the entire non-aqueous solvent is an ester series solvent having 24 to 36 carbon atoms.

According to another aspect of the present invention, there is provided a non-aqueous ink composition for ink jet, comprising a pigment, a dispersant, and a non-aqueous solvent, wherein at least 25% by weight of the entire non-aqueous solvent is an ester series solvent having 25 to 36 carbon atoms, and the balance of the non-aqueous solvent is an ester series solvent having 24 to 36 carbon atoms.

According to still another aspect of the present invention, there is provided a non-aqueous ink composition for ink jet, comprising a pigment, a dispersant, and a non-aqueous solvent, wherein 25% or more but 75% or less by weight of the entire non-aqueous solvent is an ester series solvent having 24 to 36 carbon atoms, and the balance of the non-aqueous solvent is vegetable oil.

Additional objects and advantages of the invention are given in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Some embodiments of the present invention will now be described.

The non-aqueous ink composition for ink jet according to one embodiment of the present invention is prepared by dispersing a pigment in a non-aqueous solvent by using a dispersant. The non-aqueous solvent denotes all the general solvents excluding water and at least 50% by weight of the entire non-aqueous solvent is an ester series solvent having 24 to 36 carbon atoms. The expression "%" used herein denotes "% by weight" unless otherwise specified.

The ester series solvent having 24 to 36 carbon atoms includes, for example, isocetyl 2-ethylehexanoate, cetyl 2-ethylhexanoate, octyl palmitate, octyl dodecyl pivalate, isocetyl myristate, octyl dodecyl dimethyl octanoate, glycerin tri(caprylcapric acid), 2-hexyl decyl isostearate, isocetyl stearate, trimethylol propane tri 2-ethyl hexanoate and isostearyl isostearate. The present inventors have found that these ester series solvents exhibit highly desirable properties in that the PP film is not swollen nor significantly deformed. In order to obtain the satisfactory effect, it is defined that at least 50% of the entire non-aqueous solvent should be constituted by the ester series solvent having 24 to 36 carbon atoms. It is more desirable that at least 75% of the entire non-aqueous solvent is constituted by the ester series solvent having 24 to 36 carbon atoms and, most desirably, 100% of the non-aqueous solvent is the ester series solvent having 24 to 36 carbon atoms.

The ester series solvent having 24 to 36 carbon atoms can be used singly or in the form of a mixture of at least two different kinds of the ester series solvents.

The non-aqueous solvent may contain at least one of the following solvents, provided that at least one solvent constitutes at most 50% by weight of the non-aqueous solvent. The solvents are, for example, an ester series solvent having no more than 23 carbon atoms, an alcoholic solvent, a higher fatty acid series solvent, an ether series solvent, an aliphatic hydrocarbon series solvent, and an aromatic hydrocarbon series solvent.

To be more specific, the ester series solvent having no more than 23 carbon atoms include, for example, 2-ethyl hexyl isononanoate, isononyl isononanoate, isodecyl isononanoate, isotridecyl isononanoate, methyl laurate, ethyl laurate, isopropyl laurate, methyl myristate, ethyl myristate, isopropyl myristate, methyl palmitate, ethyl palmitate, isopropyl palmitate, methyl oleate, ethyl oleate, isopropyl oleate, methyl linoleate, ethyl linoleate, isopropyl linoleate, methyl isostearate, ethyl isostearate, isopropyl isostearate, methyl soybean oil, ethyl soybean oil, isopropyl soybean oil, di 2-ethyl hexyl succinate, diethyl adipate, diisopropyl adipate, diethyl sebacate, and diisopropyl sebacate.

The alcoholic solvents include, for example, isomyristyl alcohol, isopalmityl alcohol, isostearyl alcohol, and oleyl alcohol. The higher fatty acid series solvents include, for example, isononanoic acid, isomyristic acid, oleic acid, linoleic acid, and isostearic acid. In view of the dispersion stability of the pigment and the storing properties of the ink, it is desirable for the balance of the non-aqueous solvent to be formed of ester series solvents having at most 23 carbon atoms.

The ether series solvents include, for example, diethyl glycol monobutyl ether, ethylene glycol monobutyl ether, propylene glycol monobutyl ether, and propylene glycol dibutyl ether.

Aliphatic hydrocarbon series solvents include, for example, Teclean N-16, Teclean N-20, Teclean N-22, Nisseki naphthesol L, Nisseki naphthesol M, Nisseki naphthesol H, 0-number solvent L, 0-number solvent M, 0-number solvent H, Nisseki isosol 300, Nisseki isosol 400, AF-4, AF-5, AF-6, and AF-7, which are manufactured by Nippon Oil Co., Ltd., Isopar G, Isopar H, Isopar L, Isopar M, Exxol D40, Exxol D80, Exxol D100, Exxol D130, and Exxol D140, which are manufactured by Exxon Inc., and moresco white P-55, P-60, P-70, P-80, P-85, P-100, P-120, P-150, P-200, moresco bioless U-6, U-7, and U-8, which are manufactured by Matsumura Oil Research K.K. Further, the aromatic hydrocarbon series solvents include, for example, Nisseki leansol G.

In the non-aqueous ink composition for ink jet according to another embodiment of the present invention, at least 25% by weight of the entire non-aqueous solvent is ester series solvents having 25 to 36 carbon atoms, and the balance of the non-aqueous solvent is an ester series solvents having 24 to 36 carbon atoms. Where the ester series solvents having 25 to 36 carbon atoms are contained in an amount of at least 25% of the total weight of the non-aqueous solvent, it is possible to prevent fine speck-like recesses other than deformation from being generated in the PP film. The ester series solvents having 25 to 36 carbon atoms include, for example, octyl dodecyl pivalate, isocetyl myristate, octyl dodecyl dimethyl octanoate, glycerin tri (capryl.capric acid), 2-hexyl decyl isostearate, isocetyl stearate, trimethylol propane tri 2-ethyl hexanoate, and isostearyl isostearate. These solvents can be used singly or in the form a mixture of at least two of these solvents.

It is more desirable for the ester series solvents having 25 to 36 carbon atoms to be contained in the non-aqueous solvent in an amount of at least 50% of the total weight of the non-aqueous solvent, and most desirably, in an amount of at least 75% of the total weight of the non-aqueous solvent.

In this case, the balance of the non-aqueous solvent is the ester series solvents having 24 to 36 carbon atoms.

In the non-aqueous ink composition for ink jet according to another embodiment of the present invention, 25% or more but 75% or less by weight of the entire non-aqueous solvent is an ester series solvent having 24 to 36 carbon atoms, and the balance of the non-aqueous solvent is a vegetable oil. Examples of the ester series solvent having 24 to 36 carbon atoms are the same as those listed before. Where the ester series solvents having 24 to 36 carbon atoms are contained in an amount of 25% or more but 75% or less of the total weight of the non-aqueous solvent, it is possible to assure an ink dispersion stability and an ink discharging stability. On the other hand, where the balance of the non-aqueous solvent is a vegetable oil, it is possible to prevent fine speck-like recesses other than deformation from being generated in the PP film.

Examples of the vegetable oil are soybean oil, colza seed oil, corn oil, flaxseed oil, safflower oil and coconut oil. These types of vegetable oils may be used solely or in combination of two or more.

The non-aqueous ink composition for ink jet according to an embodiment of the present invention can be prepared by dispersing a pigment in the non-aqueous solvent described above by using a dispersant.

The pigment includes, for example, a light absorbable pigment. The light absorbable pigment noted above includes, for example, carbon series pigments such as carbon black, a carbon refind, and carbon nanotube; metal oxide pigments such as iron black, cobalt blue, zinc oxide, titanium oxide, chromium oxide, and iron oxide; a sulfide pigment such as zinc sulfide; a phthalocyanine series pigment; pigments made of salts such as a sulfate of a metal, a carbonate of a metal, a silicate of a metal and a phosphate of a metal; and pigments made of a metal powder such as an aluminum powder, a bronze powder, and a zinc powder.

Further, it is also possible to employ organic pigments including, for example, dye chelate (basic dye chelate, acidic dye chelate); nitro pigments; nitroso pigments such as aniline black and naphthol green B; azo pigments such as Bordeaux 10B, Lake red 4R and chromophthal red (including azo lake, insoluble azo pigment, condensed azo pigment, chelate azo pigment); Lake pigments such as Peacock blue lake and Rhodamine lake; phthalocyanine pigments such as phthalocyanine blue; polycyclic pigments (such as perylene pigment, perinone pigment, anthraquinone pigment, quinacridone pigment, dioxane pigment, thioindigo pigment, isoindolinone pigment, quinophthalene pigment, etc.); threne pigments such as thioindigo red and indanthrone blue; quinacridine pigment; and isoindolinone pigment.

The pigments that can be used in a black ink include, for example, Raven 5750, Raven 5250, Raven 5000, Raven 3500, Raven 1255, and Raven 700, which are manufactured by Columbia Inc., Regal 400R, Regal 330R, Regal 660R, Mogul L, Monarch 700, Monarch 800, Monarch 880, Monarch 900, Monarch 1000, Monarch 1100, Monarch 1300, and Monarch 1400, which are manufactured by Cabot Inc., No. 2300, No. 900, MCF 88, No. 33, No. 40, No. 45, No. 52, MA7, MA8, MA100, and No. 2200B, which are manufactured by Mitsubishi Chemical Co., Ltd., and Color Black FW1, Color Black FW2, Color Black FW2V, Color Black FW18, Color Black FW200, Color Black S150, Color Black S160, Color Black S170, Printex 35, Printex 45, Printex U, Printex V, Printex 140U, Special Black 6, Special Black 5, Special Black 4A and Special Black 4.

The pigments that can be used in a yellow ink include, for example, Yellow 128, C.I. Pigment Yellow 129, Pigment Yellow 151, C.I. Pigment Yellow 154, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114 and C.I. Pigment.

The pigments that can be used in a magenta ink include, for example, C.I. Pigment Red 122, C.I. Pigment Red 123, C.I. Pigment Red 168, C.I. Pigment Red 184, C.I. Pigment Red 202, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1 and C.I. Pigment Red 112.

Further, the pigments that can be used in a cyan ink include, for example, C.I. Pigment Blue 15:3, C.I. Pigment Blue 15:34, C.I. Pigment Blue 16, C.I. Pigment Blue 22, C.I. Pigment Blue 60, C.I. Pigment Blue 1, C.I. Pigment Blue 2, C.I. Pigment Blue 3, C.I. Vat Blue 4 and C.I. Vat Blue 60.

In general, the pigments given above are dispersed in the non-aqueous solvent in an amount of about 1 to 25% of the weight of the entire composition.

The pigment dispersant that is used in general in the non-aqueous solvent can be used as a dispersant for dispersing the pigments in the solvent. An optional pigment dispersant can be used as far as the dispersant is compatible with the non-aqueous organic solvent, and permits stably dispersing the pigment in the form of fine particles. To be more specific, the dispersant includes, for example, sorbitan fatty acid ester (such as sorbitan monooleate, sorbitan monolaurate, sorbitan sesquioleate, and sorbitan oleate), polyoxyethylene sorbitan fatty acid ester (such as polyoxyethylene sorbitan monostearate and polyoxyethylene sorbitan monooleate), polyethylene glycol fatty acid esters (such as polyoxyethylene monostearate and polyethylene glycol diisocyanate), polyoxyethylene alkyl phenyl ether (such as polyoxyethylene nonyl phenyl ether and polyoxyethylene octyl phenyl ether), and nonionic surfactants such as a fatty acid diethanol amide series.

A high molecular weight dispersant can also be used. In this case, a high molecular weight compound having a molecular weight not smaller than 1,000 can be suitably used. The high molecular weight compound having a molecular weight not smaller than 1,000 includes, for example, styrene-maleic acid resin, styrene-acrylic acid resin, rosin, BYK-160, 162, 164, 182 (i.e., urethane series high molecular compounds manufactured by Big Chemie Inc.), EFKA-47, LP-4050 (i.e., urethane series high molecular compounds manufactured by EFKA Inc.), EFKA-4300 (i.e., a polyacrylate series high molecular dispersant manufactured by EFKA Inc.), Solsperse 24,000 (i.e., polyester series high molecular compound manufactured by Zeneka Inc.) and Solsperse 17,000 (i.e., a fatty acid diethanol amide series manufactured by Zeneka Inc.).

The dispersant exemplified above, if present in an amount of about 25 to 200% based on the weight of the pigment, produces its effect sufficiently.

In manufacturing the non-aqueous ink composition for ink jet according to the embodiment of the present invention, a pigment and a dispersant are mixed with a specified non-aqueous solvent, and a dispersion treatment is applied to the resultant mixture by using a dispersing apparatus such as a bead mill, followed by removing, for example, the pigment agglomerate by, for example, a filter so as to obtain a desired ink composition.

The present invention will now be described in more detail with reference to Examples. Incidentally, the present invention is not limited to the following Examples unless the description is deviated from the technical idea of the present invention.

EXAMPLE 1

Mixed were 91 parts by weight of isocetyl 2-ethyl hexanoate used as a non-aqueous solvent, 5 parts by weight of a channel carbon black (C.I. No. 77266: Special black 4A manufactured by Dexa Inc.) used as a pigment, and 4 parts by weight of Disperbyk 116 (trade name of a dispersant manufactured by Big Chemie Inc.), and the mixture was dispersed by using a bead mill. Finally, the resultant dispersion was filtered by using a filter of 3 μm so as to remove the pigment agglomerate, etc., thereby obtaining a non-aqueous ink composition for ink jet for Example 1.

EXAMPLES 2-11 AND COMPARATIVE EXAMPLES 1 TO 10

A non-aqueous ink composition for ink jet for each of Examples 2-11 and Comparative Examples 1 to 10 was prepared as in Example 1, except that the solvents shown in Table 1 were used.

Table 1 shows the number of carbon atoms contained in the solvent and the molecular weight of the solvent used in each of Examples 2-11 and Comparative Examples 1 to 10. As shown in Table 1, used in Examples 1 to 11 were solvents each having 24 to 36 carbon atoms. Also, used in Comparative Examples 1 to 7 were solvents each having 23 or less carbon atoms. Further, used in Comparative Examples 8 to 10 were solvents each having at least 37 carbon atoms.

TABLE 1

| | Name of solvent | Number of carbon atoms | Molecular weight |
|---|---|---|---|
| Example 1 | isocetyl 2-ethyl hexanoate | 24 | 369 |
| Example 2 | cetyl 2-ethyl hexanoate | 24 | 369 |
| Example 3 | octyl palmitate | 24 | 369 |
| Example 4 | octyl dodecyl pivalate | 25 | 383 |
| Example 5 | isocetyl myristate | 30 | 453 |
| Example 6 | octyl dodecyl dimethyl octanoate | 30 | 453 |
| Example 7 | glycerin tri (capryl•capric acid) | 29 | 499 |
| Example 8 | 2-hexyl decyl isostearate | 34 | 509 |
| Example 9 | isocetyl stearate | 34 | 509 |
| Example 10 | trimethylol propane tri 2-ethyl hexanoate | 30 | 513 |
| Example 11 | isostearyl isostearate | 36 | 537 |
| Comparative Example 1 | isotridecyl dimethyl octanoate | 23 | 355 |
| Comparative Example 2 | isotridecyl isononanoate | 22 | 341 |
| Comparative Example 3 | isopropyl isostearate | 21 | 327 |
| Comparative Example 4 | ethyl isostearate | 20 | 313 |
| Comparative Example 5 | isodecyl isononanoate | 19 | 299 |
| Comparative Example 6 | isononyl isononanoate | 18 | 284 |
| Comparative Example 7 | 2-ethyl hexyl isononanoate | 17 | 270 |
| Comparative Example 8 | pentaerythrityl tetra 2-ethyl hexanoate | 37 | 641 |
| Comparative Example 9 | trimethylol propane tri-isostearate | 60 | 934 |
| Comparative Example 10 | pentaerythrityl tetra isostearate | 77 | 1202 |

Each of the non-aqueous ink compositions for ink jet thus prepared was examined in respect of the viscosity at 25° C., the discharging stability in the ink jet printing stage, and the damage done to the resin film.

In measuring the viscosity at 25° C., TV-33 type viscometer manufactured by Toki Sangyo K.K. was used. In view of the situation that the ink can be supplied easily into the ink jet head, it is desirable for the viscosity of the ink composition at 25° C. to be no more than about 100 mPa·sec.

For evaluating the discharging stability, an ink image was formed on an ordinary paper sheet (Toshiba copying paper sheet P-50S) by using an image evaluating apparatus provided with a piezo type ink jet head (type CB1, 318 nozzles, manufactured by Toshiba Tec K.K.). In the ink discharging stage, the ink within the head was heated in accordance with the ink viscosity so as to lower the viscosity of the ink. Incidentally, it is desirable for the ink temperature in discharging the ink composition to be no more than 40° C.

because, in this case, it is possible to save the energy required for heating the ink within the head. Ink images were formed by using all of 318 nozzles of the ink jet head so as to obtain a printed image. In respect of the printed matter thus obtained, dropping of the image from the printed matter was visually judged. Whether or not the printed matter was free from dropping of the image was evaluated, and the results of the evaluation are given in Table 2 by marks ○ and X, which are defined as given below:

○: dropping of the image was not recognized

X: dropping of the image was recognized

In order to examine the damage done to the resin film, a solid printing was applied to the area that was ⅓ of the paper sheet of size A4 by using each of the non-aqueous ink compositions for ink jet. The printed matter thus obtained was put in A4 REFILE (La-A21N) and a transparent pocket file (No. 103) manufactured by Kingjim K.K. and stored for 10 days under room temperature (25° C.). Then, the breakage of the resin file caused by deformation of the film was evaluated. The results of the evaluation are also given in Table 2, which are denoted in Table 2 by marks given below:

◎: Deformation was not recognized;

○: Deformation was not recognized, but speck-like fine recesses were observed;

Δ: Film deformation not larger than 1 mm was observed;

X: Film deformation not smaller than 1 mm was observed so as to break the resin file.

The film damage represented by marks ◎, ○ and Δ in Table 2 fell within an allowable range.

Results thus obtained are summarized in the following Table 2.

TABLE 2

|  | Viscosity (mPa · sec) | Ink temperature | Image dropping | Film damage |
|---|---|---|---|---|
| Example 1 | 15.8 | 30° C. | ○ | ○ |
| Example 2 | 16.7 | 30° C. | ○ | ○ |
| Example 3 | 16.6 | 30° C. | ○ | ○ |
| Example 4 | 20.6 | 35° C. | ○ | ◎ |
| Example 5 | 25.8 | 40° C. | ○ | ◎ |
| Example 6 | 29.0 | 45° C. | ○ | ◎ |
| Example 7 | 35.1 | 50° C. | ○ | ◎ |
| Example 8 | 45.3 | 55° C. | ○ | ◎ |
| Example 9 | 36.8 | 50° C. | ○ | ◎ |
| Example 10 | 62.8 | 60° C. | ○ | ◎ |
| Example 11 | 49.9 | 55° C. | ○ | ◎ |
| Comparative Example 1 | 15.0 | 30° C. | ○ | X |
| Comparative Example 2 | 14.5 | 30° C. | ○ | X |
| Comparative Example 3 | 13.3 | 30° C. | ○ | X |
| Comparative Example 4 | 11.6 | 25° C. | ○ | X |
| Comparative Example 5 | 10.4 | 25° C. | ○ | X |
| Comparative Example 6 | 8.9 | 25° C. | ○ | X |
| Comparative Example 7 | 7.5 | 25° C. | ○ | X |
| Comparative Example 8 | 140.8 | — | X | — |
| Comparative Example 9 | 123.3 | — | X | — |
| Comparative Example 10 | 256.4 | — | X | — |

As in apparent from Table 2, the ink composition for each of Examples 1 to 11, which comprised ester series solvents having 24 to 36 carbon atoms, was free from the dropping of the image and the damage done to the film fell within the allowable range. Particularly, the damage done to the film was markedly suppressed in the ink composition for Examples 4 to 11. It is considered reasonable to understand that the prominent effect was derived from the use of the ester series solvents having at least 25 carbon atoms.

On the other hand, in the ink composition for each of Comparative Examples 1 to 7, the ester series solvent used had 23 or less carbon atoms. In this case, the damage done to the film was large, and the transparent film of the resin file was markedly deformed. Also, when it comes to the ink composition for each of Comparative Examples 8 to 10, the ester series solvent used had not smaller than 37 carbon atoms. In this case, the ink had an excessively high viscosity, with the result that it was impossible to discharge the ink composition from the ink jet head, resulting in failure to form an ink image.

As pointed out above, it has been confirmed by Examples 1 to 11 and Comparative Examples 1 to 10 that it is possible to obtain an ink composition satisfactory in any of the viscosity at 25° C., the ink discharging stability in the recording stage, and the damage done to the film in the case of using an ester series solvent having 24 to 36 carbon atoms as the non-aqueous solvent.

EXAMPLES 12 TO 43 AND COMPARATIVE EXAMPLES 11 TO 18

Ink compositions were prepared by using a mixture of a plurality of ester series solvents as the non-aqueous solvent and the properties of the ink compositions thus prepared were examined.

Table 3 shows the number of carbon atoms contained in the ester series solvent and the molecular weight of the ester series solvent:

TABLE 3

| Solvent | Compound name | Number of carbon atoms | Molecular weight |
|---|---|---|---|
| a | isocetyl myristate | 30 | 453 |
| b | octyl dodecyl dimethyl octanoate | 30 | 453 |
| c | octyl palmitate | 24 | 369 |
| d | isocetyl 2-ethyl hexanoate | 24 | 369 |
| e | ethyl isostearate | 20 | 313 |
| f | 2-ethyl hexyl isononanoate | 17 | 270 |

Ink compositions for Examples 12 to 43 were prepared as in Example 1, except that the solvents shown in Table 3 were mixed at the mixing ratio (% by weight) shown in Table 4. Further, ink compositions for Comparative Examples 11 to 18 were prepared as in Example 1, except that the solvents shown in Table 3 were mixed at the mixing ratio (% by weight) shown in Table 5.

Incidentally, each of the solvents e and f had a small number, which is less than 24, of carbon atoms as shown in Table 3. In the ink compositions according to the embodiment of the present invention, the amount of the ester series solvent having less than 24 carbon atoms is defined to be not larger than 50% by weight of the non-aqueous solvent.

TABLE 4

|  | a | b | c | d | e | f |
|---|---|---|---|---|---|---|
| Example 12 | 75 |  | 25 |  |  |  |
| Example 13 | 50 |  | 50 |  |  |  |
| Example 14 | 25 |  | 75 |  |  |  |
| Example 15 | 20 |  | 80 |  |  |  |

TABLE 4-continued

|  | a | b | c | d | e | f |
|---|---|---|---|---|---|---|
| Example 16 | 75 |  |  | 25 |  |  |
| Example 17 | 50 |  |  | 50 |  |  |
| Example 18 | 25 |  |  | 75 |  |  |
| Example 19 | 20 |  |  | 80 |  |  |
| Example 20 |  | 75 |  | 25 |  |  |
| Example 21 |  | 50 |  | 50 |  |  |
| Example 22 |  | 25 |  | 75 |  |  |
| Example 23 |  | 20 |  | 80 |  |  |
| Example 24 |  |  | 75 | 25 |  |  |
| Example 25 |  |  | 50 | 50 |  |  |
| Example 26 |  |  | 25 | 75 |  |  |
| Example 27 |  |  | 20 | 80 |  |  |
| Example 28 | 75 |  |  |  | 25 |  |
| Example 29 | 50 |  |  |  | 50 |  |
| Example 30 | 75 |  |  |  |  | 25 |
| Example 31 | 50 |  |  |  |  | 50 |
| Example 32 |  | 75 |  |  | 25 |  |
| Example 33 |  | 50 |  |  | 50 |  |
| Example 34 |  | 75 |  |  |  | 25 |
| Example 35 |  | 50 |  |  |  | 50 |
| Example 36 |  |  | 75 |  | 25 |  |
| Example 37 |  |  | 50 |  | 50 |  |
| Example 38 |  |  | 75 |  |  | 25 |
| Example 39 |  |  | 50 |  |  | 50 |
| Example 40 |  |  |  | 75 | 25 |  |
| Example 41 |  |  |  | 50 | 50 |  |
| Example 42 |  |  |  | 75 |  | 25 |
| Example 43 |  |  |  | 50 |  | 50 |

TABLE 5

|  | a | b | c | d | e | f |
|---|---|---|---|---|---|---|
| Comparative Example 11 | 40 |  |  |  | 60 |  |
| Comparative Example 12 | 40 |  |  |  |  | 60 |
| Comparative Example 13 |  | 40 |  |  | 60 |  |
| Comparative Example 14 |  | 40 |  |  |  | 60 |
| Comparative Example 15 |  |  | 40 |  | 60 |  |
| Comparative Example 16 |  |  | 40 |  |  | 60 |
| Comparative Example 17 |  |  |  | 40 | 60 |  |
| Comparative Example 18 |  |  |  | 40 |  | 60 |

In Comparative Examples 11 to 18, the ester series solvents having 24 to 36 carbon atoms were contained in the non-aqueous solvent in an amount of 40% of the entire non-aqueous solvent, and the ester series solvents having less than 24 carbon atoms were contained in the non-aqueous solvent in an amount of 60% by weight of the entire non-aqueous solvent, as shown in Table 5.

The viscosity at 25° C., the ink discharging stability in the recording stage, and the damage done to the film were examined as described previously in respect of the ink compositions thus obtained. Tables 6 and 7 show the results.

TABLE 6

|  | Viscosity (mPa · sec) | Ink temperature | Image dropping | Film damage |
|---|---|---|---|---|
| Example 12 | 23.6 | 35° C. | ○ | ◎ |
| Example 13 | 21.0 | 35° C. | ○ | ◎ |
| Example 14 | 18.8 | 30° C. | ○ | ◎ |

TABLE 6-continued

|  | Viscosity (mPa · sec) | Ink temperature | Image dropping | Film damage |
|---|---|---|---|---|
| Example 15 | 18.3 | 30° C. | ○ | ○ |
| Example 16 | 22.8 | 35° C. | ○ | ◎ |
| Example 17 | 20.1 | 35° C. | ○ | ◎ |
| Example 18 | 17.7 | 30° C. | ○ | ◎ |
| Example 19 | 17.2 | 30° C. | ○ | ○ |
| Example 20 | 26.4 | 40° C. | ○ | ◎ |
| Example 21 | 23.6 | 35° C. | ○ | ◎ |
| Example 22 | 20.5 | 35° C. | ○ | ◎ |
| Example 23 | 19.9 | 35° C. | ○ | ○ |
| Example 24 | 25.2 | 35° C. | ○ | ◎ |
| Example 25 | 22.5 | 35° C. | ○ | ◎ |
| Example 26 | 19.3 | 35° C. | ○ | ◎ |
| Example 27 | 18.7 | 30° C. | ○ | ○ |
| Example 28 | 20.5 | 35° C. | ○ | ○ |
| Example 29 | 16.1 | 30° C. | ○ | Δ |
| Example 30 | 19.7 | 35° C. | ○ | ○ |
| Example 31 | 14.3 | 30° C. | ○ | Δ |
| Example 32 | 24.2 | 40° C. | ○ | ○ |
| Example 33 | 19.9 | 35° C. | ○ | Δ |
| Example 34 | 23.7 | 35° C. | ○ | ○ |
| Example 35 | 17.4 | 30° C. | ○ | Δ |
| Example 36 | 14.9 | 30° C. | ○ | ○ |
| Example 37 | 14.0 | 30° C. | ○ | Δ |
| Example 38 | 13.2 | 30° C. | ○ | ○ |
| Example 39 | 10.4 | 25° C. | ○ | Δ |
| Example 40 | 14.5 | 30° C. | ○ | ○ |
| Example 41 | 13.7 | 30° C. | ○ | Δ |
| Example 42 | 12.5 | 25° C. | ○ | ○ |
| Example 43 | 9.9 | 25° C. | ○ | Δ |

TABLE 7

|  | Viscosity (mPa · sec) | Ink temperature | Image dropping | Film damage |
|---|---|---|---|---|
| Comparative Example 11 | 15.5 | 30° C. | ○ | X |
| Comparative Example 12 | 13.6 | 30° C. | ○ | X |
| Comparative Example 13 | 19.2 | 35° C. | ○ | X |
| Comparative Example 14 | 16.3 | 30° C. | ○ | X |
| Comparative Example 15 | 13.2 | 30° C. | ○ | X |
| Comparative Example 16 | 9.6 | 25° C. | ○ | X |
| Comparative Example 17 | 12.9 | 25° C. | ○ | X |
| Comparative Example 18 | 9.0 | 25° C. | ○ | X |

As in apparent from Tables 6 and 7, the image dropping was not recognized and the damage done to the film was small in any of the ink compositions for Examples 12 to 43 in which the ester series solvents having 24 to 46 carbon atoms were contained in the non-aqueous solvent in an amount not smaller than 50%. Particularly, the non-aqueous solvent consisted solely of the ester series solvents having 24 to 36 carbon atoms in Examples 12 to 27. In this case, it has been found possible to decrease markedly the damage done to the film. Among the ink compositions for Examples 12 to 27, in the ink compositions for Examples 12-14, 16-18, 20-22 and 24-26, at least 25% of the entire weight of the non-aqueous solvent is the ester series solvents having 25 to 36 carbon atoms and the balance of the non-aqueous solvent is the ester series solvents having 24 to 36 carbon atoms. In each of these Examples, the resin film was not deformed at all, supporting the effect produced by the ester series solvents having 25 to 36 carbon atoms.

On the other hand, in the ink composition for each of Comparative Examples 11 to 18, less than 50% of the entire weight of the non-aqueous solvent is the ester series solvents having 24 to 36 carbon atoms. As a result, the transparent film of the resin file was deformed in all of these ink compositions for these Comparative Examples.

As pointed out above, it has been confirmed by these Examples and Comparative Examples that the use of the non-aqueous solvent containing at least 25% by weight of the ester series solvents having 25 to 36 carbon atoms makes it possible to obtain an ink composition that permits further decreasing the damage done to the film of the resin file.

EXAMPLES 44 TO 55 AND COMPARATIVE EXAMPLES 19 TO 24

In the Examples and Comparative Examples described in the following, a mixture of the ester series solvents having 24 to 36 carbon atoms and the aliphatic hydrocarbon series solvents or the alcoholic solvents is used as the non-aqueous solvent. Specifically, ink compositions were prepared by mixing various solvents at prescribed mixing ratios so as to examine the properties of the ink compositions thus prepared.

Table 8 shows the molecular weight of each of the ester series solvents, the aliphatic hydrocarbon series solvents and the alcoholic solvents used.

TABLE 8

| Solvent | Compound name | Molecular weight |
|---|---|---|
| b | octyl dodecyl dimethyl octanoate | 453 |
| c | octyl palmitate | 369 |
| g | moresco white P-60 | 300 |
| h | moresco white P-100 | 357 |
| i | polybutene | 300 |
| j | isostearyl alcohol | 270 |
| k | hexyl decanol | 242 |
| l | oleyl alcohol | 268 |

Ink compositions for Examples 44 to 55 were obtained as in Example 1, except that the ester series solvents shown in Table 8 were mixed at the mixing ratios shown in Table 9 so as to prepare non-aqueous solvents and that the solsperse 13940 (Avecia Inc.) was used as the dispersant. Also, ink compositions for Examples 56 to 67 were obtained as in Example 1, except that used was non-aqueous solvents prepared by mixing the ester series solvents at the mixing ratios shown in Table 9 and that ethylene oxide-propylene oxide block copolymer was used as the dispersant.

Further, obtained were ink compositions for Comparative Examples 19 to 24 as in Example 1, except that used were non-aqueous solvents prepared by mixing the ester series solvents at the mixing ratios (% by weight) shown in Table 10, and that the solsperse 13940 (manufactured by Avecia Inc.) was used as the dispersant.

Incidentally, aliphatic hydrocarbon series solvents were used as solvents g, h, i, and alcoholic solvents were used as solvents j, k and l, as shown in FIG. 8. In the embodiment of present invention, the amount of each of the aliphatic hydrocarbon solvents and each of the alcoholic solvents is defined to be not larger than 50% by weight of the entire non-aqueous solvent.

TABLE 9

|  | b | c | g | h | i | j | k | l |
|---|---|---|---|---|---|---|---|---|
| Example 44 | 75 |  | 25 |  |  |  |  |  |
| Example 45 | 50 |  | 50 |  |  |  |  |  |
| Example 46 |  | 75 | 25 |  |  |  |  |  |
| Example 47 |  | 50 | 50 |  |  |  |  |  |
| Example 48 | 75 |  |  | 25 |  |  |  |  |
| Example 49 | 50 |  |  | 50 |  |  |  |  |
| Example 50 |  | 75 |  | 25 |  |  |  |  |
| Example 51 |  | 50 |  | 50 |  |  |  |  |
| Example 52 | 75 |  |  |  | 25 |  |  |  |
| Example 53 | 50 |  |  |  | 50 |  |  |  |
| Example 54 |  | 75 |  |  | 25 |  |  |  |
| Example 55 |  | 50 |  |  | 50 |  |  |  |
| Example 56 | 75 |  |  |  |  | 25 |  |  |
| Example 57 | 50 |  |  |  |  | 50 |  |  |
| Example 58 |  | 75 |  |  |  | 25 |  |  |
| Example 59 |  | 50 |  |  |  | 50 |  |  |
| Example 60 | 75 |  |  |  |  |  | 25 |  |
| Example 61 | 50 |  |  |  |  |  | 50 |  |
| Example 62 |  | 75 |  |  |  |  | 25 |  |
| Example 63 |  | 50 |  |  |  |  | 50 |  |
| Example 64 | 75 |  |  |  |  |  |  | 25 |
| Example 65 | 50 |  |  |  |  |  |  | 50 |
| Example 66 |  | 75 |  |  |  |  |  | 25 |
| Example 67 |  | 50 |  |  |  |  |  | 50 |

TABLE 10

|  | b | c | g | h | i | j | k | l |
|---|---|---|---|---|---|---|---|---|
| Comparative Example 19 | 40 |  | 60 |  |  |  |  |  |
| Comparative Example 20 |  | 40 | 60 |  |  |  |  |  |
| Comparative Example 21 | 40 |  |  | 60 |  |  |  |  |
| Comparative Example 22 |  | 40 |  | 60 |  |  |  |  |
| Comparative Example 23 | 40 |  |  |  | 60 |  |  |  |
| Comparative Example 24 |  | 40 |  |  | 60 |  |  |  |

As shown in Table 10, the non-aqueous solvent used in each of Comparative Examples 19 to 24 consisted of 40% by weight of the ester series solvents having 24 to 36 carbon atoms and 60% by weight of the aliphatic hydrocarbon solvents.

The viscosity at 25° C., the ink discharging stability at the recording stage, and the damage done to the film were examined by the procedures described previously in respect of the ink compositions thus obtained. The experimental data are given in Tables 11 and 12.

TABLE 11

|  | Viscosity (mPa · sec) | Ink temperature | Image dropping | Film damage |
|---|---|---|---|---|
| Example 44 | 25.3 | 40° C. | ○ | ○ |
| Example 45 | 22.6 | 35° C. | ○ | Δ |
| Example 46 | 16.9 | 30° C. | ○ | ○ |
| Example 47 | 17.4 | 30° C. | ○ | Δ |
| Example 48 | 33.8 | 50° C. | ○ | ○ |
| Example 49 | 35.1 | 50° C. | ○ | Δ |
| Example 50 | 27.9 | 40° C. | ○ | ○ |
| Example 51 | 29.0 | 45° C. | ○ | Δ |
| Example 52 | 28.3 | 40° C. | ○ | ○ |
| Example 53 | 25.6 | 40° C. | ○ | Δ |
| Example 54 | 19.9 | 35° C. | ○ | ○ |
| Example 55 | 20.4 | 35° C. | ○ | Δ |
| Example 56 | 54.1 | 60° C. | ○ | ○ |

TABLE 11-continued

|  | Viscosity (mPa·sec) | Ink temperature | Image dropping | Film damage |
|---|---|---|---|---|
| Example 57 | 59.4 | 60° C. | ○ | Δ |
| Example 58 | 43.2 | 55° C. | ○ | ○ |
| Example 59 | 49.3 | 55° C. | ○ | Δ |
| Example 60 | 36.0 | 50° C. | ○ | ○ |
| Example 61 | 39.3 | 50° C. | ○ | Δ |
| Example 62 | 30.1 | 45° C. | ○ | ○ |
| Example 63 | 33.2 | 45° C. | ○ | Δ |
| Example 64 | 31.7 | 45° C. | ○ | ○ |
| Example 65 | 34.0 | 50° C. | ○ | Δ |
| Example 66 | 24.8 | 40° C. | ○ | ○ |
| Example 67 | 28.9 | 45° C. | ○ | Δ |

TABLE 12

|  | Viscosity (mPa·sec) | Ink temperature | Image dropping | Film damage |
|---|---|---|---|---|
| Comparative Example 19 | 21.9 | 35° C. | ○ | X |
| Comparative Example 20 | 17.6 | 30° C. | ○ | X |
| Comparative Example 21 | 35.7 | 50° C. | ○ | X |
| Comparative Example 22 | 29.5 | 45° C. | ○ | X |
| Comparative Example 23 | 25.0 | 40° C. | ○ | X |
| Comparative Example 24 | 20.9 | 35° C. | ○ | X |

As in apparent from Tables 11 and 12, the image dropping was not recognized in the ink composition for each of Examples 44 to 67, in which the non-aqueous solvent contained at least 50% by weight of the ester series solvents having 24 to 36 carbon atoms. In addition, the ink composition for each of Examples 44 to 67 was free from the damage done to the film. Incidentally, the ink composition having a viscosity no more than 28.5 mPa·sec at 25° C. is capable of forming an ink image when the ink composition is discharged under temperatures not higher than 40° C., as in apparent from the experimental data for Example 52.

On the other hand, the transparent film of the resin file was deformed in the ink composition for any of Comparative Examples 19 to 24 in which the non-aqueous solvent contained less than 50% by weight of the ester series solvents having 24 to 36 carbon atoms.

As in apparent from the experimental data, it has been confirmed that an ink composition in which the non-aqueous solvent contains at least 50% by weight of the ester series solvents having 24 to 36 carbon atoms permits achieving a satisfactory ink discharging stability and also permits suppressing the damage done to the film of the resin file.

EXAMPLES 68 TO 94

In the Examples described in the following, a mixture of the ester series solvents having 24 to 36 carbon atoms and a vegetable oil was used as the non-aqueous solvent, to prepare ink compositions, and the properties of the ink compositions were examined.

Table 13 shows the carbon number of the ester 5 series solvent used in each Example, and Table 14 shows the particular vegetable oil used in each case.

TABLE 13

| Solvent | Name | Carbon number |
|---|---|---|
| a | Isocetyl myristate | 30 |
| c | Octyl palmitate | 24 |
| m | Isocetyl stearate | 34 |

TABLE 14

| Vegetable oil | Name |
|---|---|
| VO1 | Soybean oil |
| VO2 | Flaxseed oil |
| VO3 | Safflower oil |

Ink compositions for Examples 68 to 94 were prepared as in Example 1, except that the ester series solvents shown in Table 13 above and the vegetable oils shown in Table 14 above were mixed at the mixing ratios (% by weight) shown in Table 15.

TABLE 15

|  | Ester series solvent | | | Vegetable oil | | |
|---|---|---|---|---|---|---|
|  | c | a | m | VO1 | VO2 | VO3 |
| Example 68 | 25 |  |  | 75 |  |  |
| Example 69 | 50 |  |  | 50 |  |  |
| Example 70 | 75 |  |  | 25 |  |  |
| Example 71 |  | 25 |  | 75 |  |  |
| Example 72 |  | 50 |  | 50 |  |  |
| Example 73 |  | 75 |  | 25 |  |  |
| Example 74 |  |  | 25 | 75 |  |  |
| Example 75 |  |  | 50 | 50 |  |  |
| Example 76 |  |  | 75 | 25 |  |  |
| Example 77 | 25 |  |  |  | 75 |  |
| Example 78 | 50 |  |  |  | 50 |  |
| Example 79 | 75 |  |  |  | 25 |  |
| Example 80 |  | 25 |  |  | 75 |  |
| Example 81 |  | 50 |  |  | 50 |  |
| Example 82 |  | 75 |  |  | 25 |  |
| Example 83 |  |  | 25 |  | 75 |  |
| Example 84 |  |  | 50 |  | 50 |  |
| Example 85 |  |  | 75 |  | 25 |  |
| Example 86 | 25 |  |  |  |  | 75 |
| Example 87 | 50 |  |  |  |  | 50 |
| Example 88 | 75 |  |  |  |  | 25 |
| Example 89 |  | 25 |  |  |  | 75 |
| Example 90 |  | 50 |  |  |  | 50 |
| Example 91 |  | 75 |  |  |  | 25 |
| Example 92 |  |  | 25 |  |  | 75 |
| Example 93 |  |  | 50 |  |  | 50 |
| Example 94 |  |  | 75 |  |  | 25 |

The viscosity at 25° C., the ink temperature and the damage done to the film were examined by the procedures described previously in respect of the ink compositions thus obtained. The experimental data are given in Table 16 below.

TABLE 16

|  | Viscosity (mPa·sec) | Ink temperature | Image dropping | Film damage |
|---|---|---|---|---|
| Example 68 | 53.4 | 55° C. | ○ | ◎ |
| Example 69 | 36.7 | 50° C. | ○ | ◎ |
| Example 70 | 24.8 | 40° C. | ○ | ◎ |
| Example 71 | 54.8 | 60° C. | ○ | ◎ |
| Example 72 | 40.0 | 50° C. | ○ | ◎ |
| Example 73 | 28.6 | 45° C. | ○ | ◎ |
| Example 74 | 58.2 | 60° C. | ○ | ◎ |

TABLE 16-continued

|  | Viscosity (mPa·sec) | Ink temperature | Image dropping | Film damage |
|---|---|---|---|---|
| Example 75 | 46.3 | 55° C. | ○ | ◎ |
| Example 76 | 39.2 | 50° C. | ○ | ◎ |
| Example 77 | 44.1 | 55° C. | ○ | ◎ |
| Example 78 | 32.5 | 45° C. | ○ | ◎ |
| Example 79 | 24.2 | 40° C. | ○ | ◎ |
| Example 80 | 47.0 | 55° C. | ○ | ◎ |
| Example 81 | 36.8 | 50° C. | ○ | ◎ |
| Example 82 | 28.4 | 40° C. | ○ | ◎ |
| Example 83 | 49.5 | 55° C. | ○ | ◎ |
| Example 84 | 41.9 | 50° C. | ○ | ◎ |
| Example 85 | 38.5 | 50° C. | ○ | ◎ |
| Example 86 | 52.6 | 55° C. | ○ | ◎ |
| Example 87 | 36.5 | 50° C. | ○ | ◎ |
| Example 88 | 24.7 | 40° C. | ○ | ◎ |
| Example 89 | 54.2 | 60° C. | ○ | ◎ |
| Example 90 | 39.8 | 50° C. | ○ | ◎ |
| Example 91 | 28.5 | 40° C. | ○ | ◎ |
| Example 92 | 57.8 | 60° C. | ○ | ◎ |
| Example 93 | 46.1 | 55° C. | ○ | ◎ |
| Example 94 | 39.1 | 50° C. | ○ | ◎ |

As in apparent from Table 16, the image dropping was not recognized, or the deformation of the resin film did not occur in any of the inks of Examples 68 to 94, in which the non-aqueous solvent contained 25% or more but 75% or less of the ester series solvents having 24 to 36 carbon atoms, and the rest was the vegetable oils.

Similar effects were obtained in also the case where the ink composition was prepared by changing the kinds of the pigments used. To be more specific, it has been found possible to obtain an ink composition that permit suppressing the damage done to the film of the resin file by constituting at least 50% of the entire weight of the non-aqueous solvent by the ester series solvents having 24 to 36 carbon atoms in any of the cases of using a yellow ink composition containing as a pigment Hostaperm Yellow H4G (Pig. Y. 151, clariant), a magenta ink composition containing as a pigment Hostaperm Pink E-WD (Pig. P. 122, clariant), and a cyan ink using as a pigment PV Fast Blue 2GLSP (Pig. Blue. 15:3, clariant). In addition, it has been found possible to obtain a satisfactory ink discharging stability. What should also be noted that it has been found possible to further suppress the damage done to the film of the resin file by using an ink composition in which the non-aqueous solvent contains at least 25% by weight of the ester series solvents having 25 to 36 carbon atoms.

As described above, according to one embodiment of the present invention, it is possible to provide a non-aqueous ink composition for ink jet, which does not break the transparent file generally used in the office and the home and which achieves a high ink spurting stability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous ink composition for an ink jet comprising a pigment, a dispersant, and a non-aqueous solvent, wherein at least 50% by weight of the entire non-aqueous solvent is an ester series solvent having 24 to 36 carbon atoms, the ester series solvent having 24 to 36 carbon atoms being at least one solvent selected from the group consisting of isocetyl 2-ethyl hexanoate, cetyl 2-ethyl hexanoate, octyl palmitate, octyl dodecyl pivalate, isocetyl myristate, octyl dodecyl dimethyl octanoate, glycerin tri(capryl.capric acid), isocetyl stearate and isostearyl isostearate.

2. The non-aqueous ink composition for an ink jet according to claim 1, wherein at least 75% by weight of the entire non-aqueous solvent is the ester series solvent having 24 to 36 carbon atoms.

3. The non-aqueous ink composition for an ink jet according to claim 1, wherein 100% by weight of the entire non-aqueous solvent is the ester series solvent having 24 to 36 carbon atoms.

4. The non-aqueous ink composition for an ink jet according to claim 1, wherein a viscosity of the ink composition at 25° C. is not higher than 28.5 mPa·s.

5. A non-aqueous ink composition for an ink jet comprising a pigment, a dispersant, and a non-aqueous solvent, wherein at least 25% by weight of the entire non-aqueous solvent is an ester series solvent having at 25 to 36 carbon atoms, and the balance of the non-aqueous solvent is an ester series solvent having 24 to 36 carbon atoms, the ester series solvent having 24 to 36 carbon atoms is at least one solvent selected from the group consisting of isocetyl 2-ethyl hexanoate, cetyl 2-ethyl hexanoate and octyl palmitate.

6. The non-aqueous ink composition for an ink jet according to claim 5, wherein a viscosity of the ink composition at 25° C. is not higher than 28.5 mPa·s.

7. A non-aqueous ink composition for an ink jet comprising a pigment, a dispersant, and a non-aqueous solvent, wherein 25% or more, but 75% or less, by weight of the entire non-aqueous solvent is an ester series solvent having 24 to 36 carbon atoms, and the balance of the non-aqueous solvent is vegetable oil, the ester series solvent having 24 to 36 carbon atoms is at least one solvent selected from the group consisting of isocetyl 2-ethyl hexanoate, cetyl 2-ethyl hexanoate and octyl palmitate.

8. The non-aqueous ink composition for an ink jet according to claim 7, wherein a viscosity of the ink composition at 25° C. is not higher than 28.5 mpa·s.

9. The non-aqueous ink composition for an ink jet according to claim 7, wherein the vegetable oil is at least one vegetable oil selected from the group consisting of soybean oil, colza seed oil, corn oil, flaxseed oil, safflower oil and coconut oil.

10. A non-aqueous ink composition for an ink jet comprising a pigment, a dispersant, and a non-aqueous solvent, wherein at least 25% by weight of the entire non-aqueous solvent is an ester series solvent having 25 to 36 carbon atoms, and the balance of the non-aqueous solvent is an ester series solvent having 24 to 36 carbon atoms, the ester series solvent having 25 to 36 carbon atoms is at least one solvent selected from the group consisting of octyl dodecyl pivalate, isocetyl myristate, octyl dodecyl dimethyl octanoate, glycerin tri(capryl.capric acid), isocetyl stearate and isostearyl isostearate.

* * * * *